Patented Feb. 26, 1924.

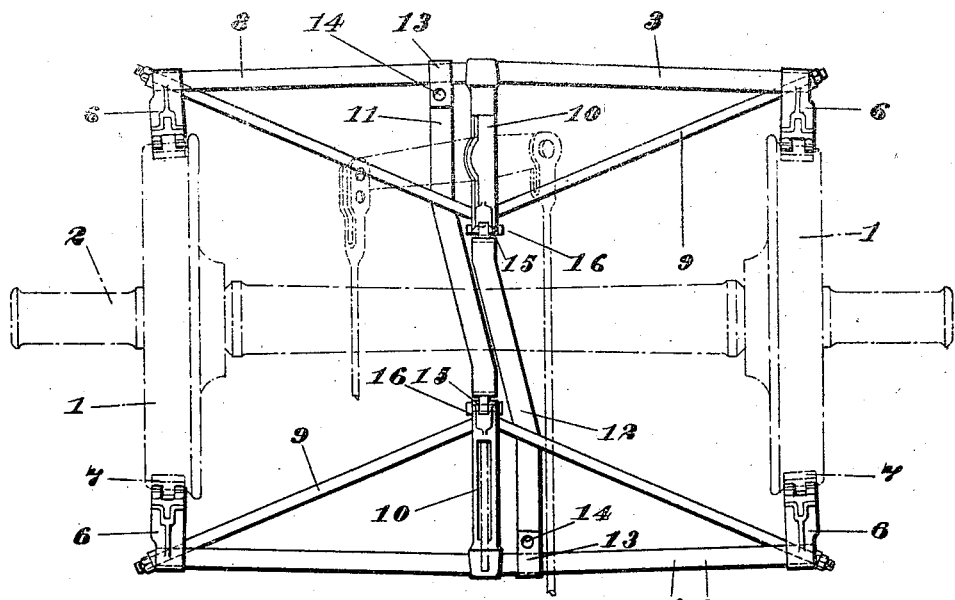
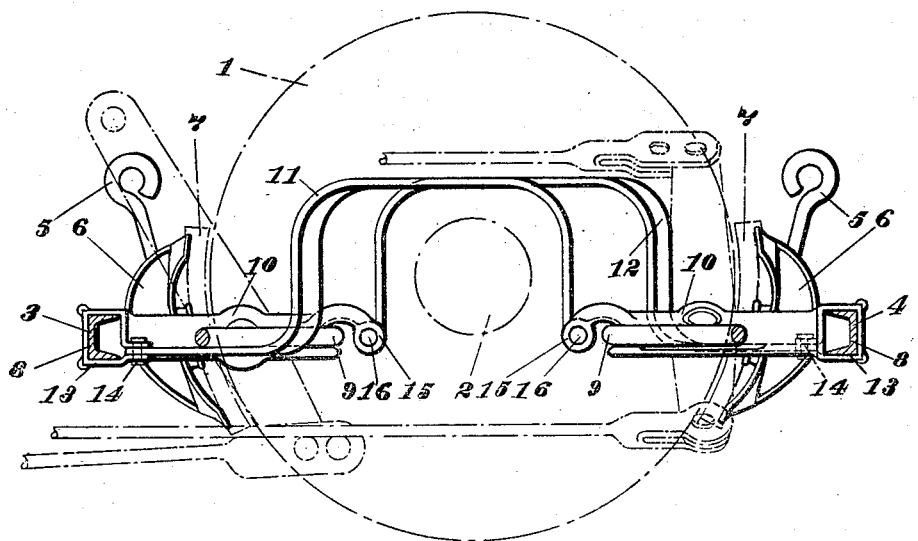

1,485,238

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

Application filed June 8, 1923. Serial No. 644,146.

*To all whom it may concern:*

Be it known that I, ALFRED K. PEHRSON, a citizen of the United States, residing in Bellevue, in the county of Allegheny and State of Pennsylvania, have invented certain new and useful Improvements in Brake Mechanism, of which the following is a specification.

This invention relates to railway truck brakes and has for an object the provision of means for maintaining the brake beams of the brake in such positions when the braking power is released, that the entire faces of the brake shoes will be substantially equidistant from the treads of the wheels.

Another object of the invention is to provide a brake mechanism in which each brake beam of a plurality of brake beams is provided with means for engaging another beam of said beams, such means cooperating with the beams to maintain them level.

A further object of the invention is to provide the brake beams of a brake mechanism with novel resilient means for maintaining such beams substantially level, and to permit the beams to move in a direction toward each other, also for imparting a releasing movement to the beams when the braking power is released.

These and other objects will be apparent from the following description.

Referring to the drawing in which like reference characters refer to like parts, Fig. 1 is a plan view of a portion of a railway car brake embodying the invention, and Fig. 2 is a side elevational view of the same.

Referring now in detail to the drawing, the reference character 1 indicates the car truck wheels, one pair only of which is illustrated, such wheels being mounted on an axle 2 in the usual manner. This axle may be mounted in the truck frame (not shown) in any preferred manner.

At one side of each pair of wheels a brake beam 3 is provided and at the opposite side a brake beam 4 is provided, which beams extend transversely of the truck, preferably from wheel to wheel, and adjacent their ends are supported from the truck by hangers 5 or any other suitable means. Each beam adjacent its ends is provided with heads 6 which in turn are provided with shoes 7 which shoes are adapted to engage the wheels 1 when the braking power is applied. These beams may be of any suitable construction, but as illustrated in the drawing each preferably comprises a compression member 8, a tension member 9 and a strut or fulcrum 10 all suitably connected together.

The beams 3 and 4 are provided with supporting members 11 and 12 respectively, each of which at one end is connected with the compression member 8 of its respective beam by means of a clamping member 13 which engages the compression member and by a bolt 14 which passes through the clamping member and the supporting member, and at its opposite end is connected with the adjacent brake beam, preferably with an extension 15 formed on the strut 10 of such beam through the medium of a pin 16 which passes through this extension and the end portion of the supporting member. Each of these members intermediate its ends passes under and contacts with the tension member 9 of its respective beam and forms a support for such tension member. The members 11 and 12 are to some extent resilient thus permitting the brake beams to move toward or away from each other. It will be noted that when the braking power is released these members being resilient will cause the brake beams 3 and 4 to move away from each other toward their released positions.

When the beams 3 and 4 are in their proper operative positions, the members 11 and 12 extend in directions longitudinally of the truck and are so connected with the beams 3 and 4 in such a manner that they cooperate to resist any tendency of the beams rotating or tilting around their points of connection with the hangers 5, thus maintaining both of the beams level.

It will be apparent to those skilled in the art to which this invention appertains, that changes may be made in the details and arrangement of the parts forming the invention, without departing from the spirit and scope of the appended claims.

Having thus described the invention what I claim as new and desire to secure by Letters Patent is:—

1. In a brake mechanism, a pair of supported brake beams, means cooperating with both of said beams for maintaining said beams level, said means comprising a plurality of members each secured to both beams.

2. In a brake mechanism, a pair of supported brake beams, a pair of members for maintaining said beams level, each of said members being connected at one end with one side of one of said beams, and at the opposite end connected with the opposite side of the other of said beams.

3. In a brake mechanism, supported brake beams, members for maintaining said beams level, each of said members at one end being connected with one of said beams outside its points of support and at its opposite end connected with the other of said beams inside of its points of support.

4. In a brake mechanism, a pair of brake beams, each comprising a tension member, a compression member and a strut, means for supporting said beams and members for maintaining said beams level, each of said members at one end being secured to the compression member of one of said beams and at its opposite end being secured to the strut of the other of said beams.

5. In a brake mechanism, a plurality of brake beams, means for supporting said beams, and means for maintaining said beams level, the last mentioned means comprising a plurality of members extending between and engaging said beams.

6. In a brake mechanism, a pair of brake beams, means for supporting said beams, and a plurality of members extending between and cooperating with said beams to maintain them level.

7. In a brake mechanism, a pair of brake beams, means for supporting said beams, and a plurality of resilient members cooperating with said beams to maintain them level and to impart a releasing movement to said beams when the braking power is released.

8. In a brake mechanism, a pair of brake beams, means for supporting said beams, and resilient members for maintaining said beams level and for imparting a releasing movement to said beams when the braking power is released, each of said members being secured to both of said beams.

9. In a brake mechanism, a pair of brake beams, each comprising a tension member, a compression member and a strut, means for supporting said beams and resilient members for maintaining said beams level and for imparting a releasing movement to said beams when the braking power is relased, each of said members at one end being connected with the compression member of one of said beams and at its opposite end being secured to the other of said beams.

10. In a brake mechanism, a pair of brake beams, means for supporting said beams, and members extending between and connected with both of said beams, said members permitting movement of said beams toward and away from said wheels, and at the same time preventing the tilting of said beams.

11. In a brake mechanism, brake beams, each comprising a compression member, tension member and a strut, means supporting said beams, and members for maintaining said beams level, each of said members at one end engaging the compression member of one of said beams and at its opposite end engages the strut of an adjacent one of said beams.

12. In a brake mechanism, a pair of brake beams, means for supporting said beams, and means associated with each of said beams for maintaining said beams level, said means comprising a plurality of resilient members.

13. In a brake mechanism, a pair of brake beams, means for supporting said beams, a pair of members extending between said beams, one end of each of said members being secured to one of said beams and the opposite end to the adjacent one of said beams.

14. In a brake mechanism, a pair of brake beams, supports for said beams, a plurality of members for maintaining said beams level, said members being secured to said beams only.

In testimony whereof, I affix my signature in the presence of two witnesses.

ALFRED K. PEHRSON.

Witnesses:
ALBERT P. R. FREY,
GEO. W. HALLSTEIN.